United States Patent Office 3,503,706
Patented Mar. 31, 1970

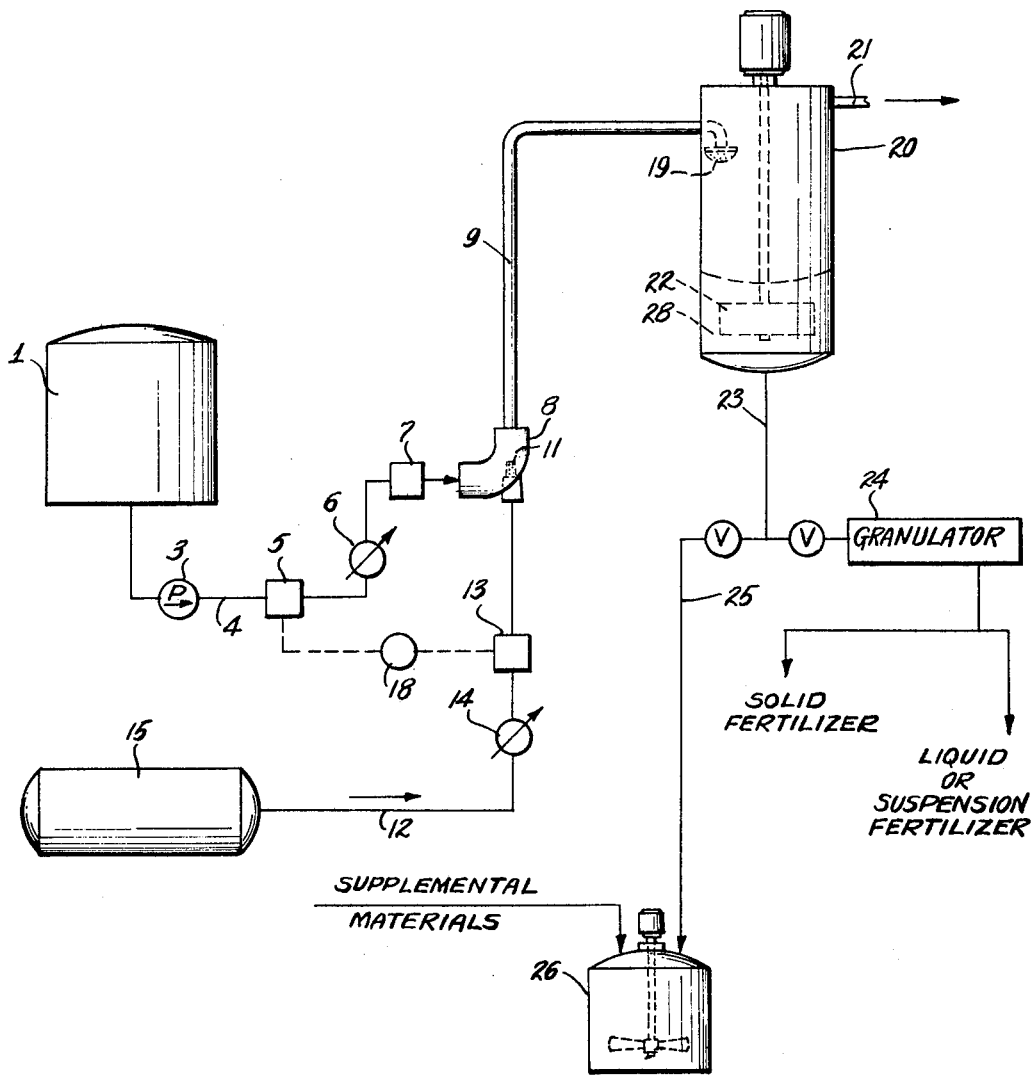

3,503,706
PROCESS FOR MANUFACTURING AMMONIUM POLYPHOSPHATE
Casimer C. Legal, Jr., Elkridge, Md., assignor to W. R. Grace & Co., New York, N.Y., a corporation of Connecticut
Continuation-in-part of applications Ser. No. 355,908, Mar. 30, 1964, Ser. No. 483,742, Aug. 30, 1965, and Ser. No. 588,034, Oct. 20, 1966. This application Aug. 5, 1968, Ser. No. 750,138
Int. Cl. C01b 25/38
U.S. Cl. 23—107    8 Claims

ABSTRACT OF THE DISCLOSURE

An improved method for producing ammonium polyphosphatic material which comprises introducing anhydrous ammonia and wet process phosphoric acid into a pipe line reactor wherein the materials react exothermically and are discharged as a hot anhydrous melt having at least a portion of its $P_2O_5$ content as non-ortho $P_2O_5$. The invention is based on the discovery that the act of agitating the hot melt as it emerges from the pipe line reactor and before granulation imparts highly desirable and unexpected properties to the ammonium polyphosphatic product.

---

This is a continuation-in-part of my copending applications Ser. No. 588,034, filed Oct. 20, 1966 and Ser. No. 483,742, filed Aug. 30, 1965, now abandoned, and Ser. No. 355,908, filed Mar. 30, 1964, now abandoned.

This invention is directed to the production of ammonium polyphosphates from wet process phosphoric acid and more particularly, to an improved process for producing an ammonium polyphosphatic product having particularly utility in the production of highly concentrated fluid and solid mixed fertilizers.

In recent years, there has been an increasing demand for polyphosphates, which demand has resulted in large part to the increased use of the salts of polyphosphoric acid in the fertilizer industry. In this regard, the use of ammonium polyphosphate prepared from wet-process phosphoric acid has been found to have particularly utility in the production of highly concentrated liquid and solid mixed fertilizers. In the case of liquid fertilizers, the use of the ammonium salts of the polyphosphoric acids is beneficial in preventing the precipitation or gelation of the salts in the product, thus rendering it possible to prepare a liquid mixed fertilizer containing increased values of both $P_2O_5$ and N.

In general, prior known processes for producing ammonium polyphosphate from wet process phosphoric acid have included the step of concentrating the wet acid until the acid was partially dehydrated to contain both ortho and polyphosphoric acid. The partially dehydrated acid, known in the art as superphosphoric acid and having a $P_2O_5$ content in the range of approximately 67–76 percent $P_2O_5$, is then ammoniated at high temperatures and pressures to produce a melt containing ammonium polyphosphate. The polyphosphate product may be granulated and sold as a dry fertilizer or as stated above, may be used in the production of stable fluid or suspension fertilizers. Such prior art methods require elaborate and extensive concentrators for dehydrating the wet process phosphoric acid. Obviously, the separate concentration step is highly undesirable due to the cost involved in special concentration equipment and in the thermal requirements or fuel required for concentration, etc. More recently there have been proposed methods for preparing ammonium polyphosphatic products from ordinary wet-process phosphoric acid (having a $P_2O_5$ content in the range of from 30 to about 56 percent by weight) wherein the separate step of subjecting the acid to an evaporating step is completely eliminated. Such a procedure is disclosed e.g., in U.S. Patent 3,382,059 to Getsinger, which issued May 7, 1968 and generally discloses a two-stage reaction system wherein wet-process acid is fed to the first stage, and anhydrous gaseous ammonia is fed in countercurrent flow from the second (reaction) stage to the first stage.

A particularly advantageous and simplified process for forming ammonium phosphate salts directly from wet-process phosphoric acid and ammonia without the intermediate step of concentrating the ortho phosphoric acid to a super acid level is disclosed in my copending application Ser. No. 588,034, filed Oct. 20, 1966. In this application, there is disclosed a direct process for preparing an ammonium polyphosphatic product having at least a portion of its $P_2O_5$ content as non-ortho $P_2O_5$ wherein wet-process phosphoric acid and anhydrous ammonia are preheated and fed into a pipe-line reactor wherein the two materials react exothermically and are discharged as a hot anhydrous melt. Preferably, and as disclosed in detail in the aforementioned application, the reaction is conducted under hydrostatic pressure resulting in a relatively complete reaction of the phosphoric acid and ammonia within a short period of time (i.e., in the order of 2–3 minutes in the pipe-line reactor). In this manner, and contra to prior processes requiring high reacton times, a product is provided which contains less than ½% Citrate Insolubles (CI). The hot melt may be granulated and solidified to form a polyphosphatic product having particularly utility in producing stable fluid fertilizers and high analysis solid mixed fertilizers.

In summary, the present invention is based on the discovery that the act of agitating the hot melt as it emerges from the pipeline reactor and before granulation imparts highly desirable and truly unexpected properties to the ammonium polyphosphatic product. In this regard, and as will be described in more detail hereinafter, a major objective in manufacturing ammonium polyphosphates is to provide a base material for the manufacture of, e.g., a 10–34–0 liquid fertilizer which may then be used to formulate high analysis mixed liquid fertilizer such as 7–21–7, 9–9–9, 6–12–6, etc. Additionally, it has unexpectively been discovered that the product produced in accordance with the present invention may be used to produce a fluid suspension type fertilizer containing about 14% N and 42% available $P_2O_5$. Prior to this invention a stable fluid suspension fertilizer containing about 14% N and 42% available $P_2O_5$ produced from wet-process phosphoric acid has not been available. Prior attempts to manufacture such a product from known processes have been unsuccessful due to formation of solid gel-like masses.

As generally described above, it is known in the art that high non-ortho $P_2O_5$ mixtures serve in sequestering impurities in wet-process phosphoric acid to prevent the formation of sludge when preparing liquid fertilizers. Prior to the present invention, it has been considered that the higher the non-ortho content, the better the sequestering properties. For example, a 50% non-ortho has been considered a highly desirable figure. However, it has been found that attaining the 50% non-ortho is a difficult and expensive operation requiring high temperatures in the order of 380° F. of the raw materials. Corrosion at this high temperature is a problem. Furthermore, even with the high non-ortho (greater than 50%) it has been found that a sludge would form upon standing due, to a certain extent, to the formation of high citrate insoluble $P_2O_5$ caused by the higher temperatures required. As discussed, and in accordance with the present invention, it has been discovered that the act of agitating the hot melt as it emerges from the pipe-line reactor and before granulation imparts highly desirable properties to the ammonium polyphosphatic product. While the explanation for this is not known, liquid fertilizers made from granulated ammonium polyphosphatic materials in accordance with the present invention show superior storage properties in the sense that essentially no sludge forms on standing over prolonged periods of time. This highly desirable feature is accomplished at much lower reaction temperatures and therefore, much lower non-ortho $P_2O_5$ content. Thus it is possible to make a 10-34-0 liquid fertilizer having low viscosity and non-sludging characteristics using an ammonium polyphosphatic product containing as little as 22% non-ortho $P_2O_5$.

It is accordingly a general object of this invention to provide a unique and improved process for preparing ammonium polyphosphatic materials.

Another and more particular object of this invention is to provide a process for preparing ammonium polyphosphate salts directly from orthophosphoric acid and ammonia without the intermediate step of concentrating the ortho-acid to a super-acid level.

Yet another object is to provide a process for preparing ammonium polyphosphate salts from wet-process phosphoric acid, said salts having particularly utility as a base material for manufacturing stable fluid fertilizers.

Still another object is to provide a continuous, simplified and economical process for manufacturing ammonium polyphosphatic materials directly from wet-process phosphoric acid which may be operated at lower temperatures and a greatly reduced reaction time than prior known processes.

Still a further object is to provide a process for preparing liquid or fluid suspension fertilizer from ammonium polyphosphate material containing less than 50% of the $P_2O_5$ content in non-ortho form.

The manner in which the foregoing and other objects are achieved in accordance with the present invention will be better understood in view of the following detailed description and accompanying drawing which forms a part of the specification and wherein;

The figure is a diagrammatic illustration of a suitable arrangement of apparatus for carrying out a particularly advantageous method embodiment of the present invention.

In accordance with the present invention, wet-process phosphoric acid containing approximately 50–56% $P_2O_5$ by weight and ammonia are continuously introduced into a tubular reactor wherein the materials react exothermically and are discharged from the exit end of the tubular reactor as a hot anhydrous melt. Preferably the acid and ammonia are preheated prior to being introduced into the reaction zone, but as stated above the requirement of extremely high temperatures of the raw materials (380° F.) is not required. In the reaction zone the acid and ammonia react, generating all the heat necessary for effecting the reaction. The product issuing from the exit end of the reactor passes into a dehydration-melt collection chamber wherein the ammonium polyphosphate melt is separated from the steam or water vapor and unreacted ammonia. As will be described in more detail hereinafter, the product melt can be handled in any one of a number of ways to produce a liquid or suspension fertilizer, or alternately, the melt may be granulated for use as a solid product.

Turning now to the drawing in detail, there is shown a suitable arrangement of apparatus for carrying out a particularly advantageous method embodiment of the present invention. Wet-process phosphoric acid, stored in a feed tank 1 is forced by a pump 3 through conduit 4, a flow recorder and controller 5, an acid heater 6 and temperature controller 7 into the elbow or inlet end 8 of a tubular pipe-line reactor 9.

An ammonia addition nozzle 11 extends through the elbow 8 into the flow path of the wet-phosphoric acid. The ammonia nozzle feeds the ammonia to the acid at the point of its greatest turbulence thus assuring a good mixing and thorough contacting of the ammonia with the acid. Liquid anhydrous ammonia is fed by the vapor pressure of the ammonia from the storage tank 15 through the ammonia feed conduit 12. An ammonia vaporizer 14 and flow controller 13, in conduit 12, is positioned between the ammonia addition nozzle 11 and the storage tank 15. As shown, a ratio controller 18 regulates the phosphoric acid flow controller 5 and the ammonia flow controller 13.

The tubular pipe-line reactor 9, which may be insulated to prevent or reduce heat loss due to radiation, extends from the elbow 8 to a nozzle 19 positioned within the upper portion of a dehydration-melt collection chamber, indicated generally at 20. The dehydration chamber serves to allow flashing of free water, molecular dehydration as well as separation of the gaseous and hot melt phases.

In this regard, and in more detail, the hot ammoniated polyphosphatic melt is discharged from the exit end of the tubular reactor into the chamber 20 wherein it is separated from the vapors, i.e. steam and unreacted ammonia gas, and is collected in the lower portion or basin 28 of the chamber. The steam and ammonia gas are discharged from the chamber through conduit 21 positioned at the top of the chamber. With reference to the drawing, the collection chamber is equipped with conventional agitating means, indicated generally at 22, which maintains the melt in a state of continuous agitation and intimate mixing. The product or anhydrous melt is subsequently discharged from the chamber by line or conduit 23.

As described in detail in my aforementioned copending patent application, the molten material may be fed into a granulator of pug mixer 24 wherein the material is solidified to form a non-hygroscopic granular solid ammonium polyphosphate. The product may be used as a fertilizer alone or in admixture with other materials. Alternately, the granular product, which is highly soluble and easily dispersed in water, may be later formed into liquid or fluid suspension fertilizers, by dissolving the product in an aqueous ammonia solution, with or without additional supplemental materials, such as urea, ammonium nitrate, potash, etc.

In this regard, and as generally stated above, the ammonium polyphosphatic product of the present invention is particularly adapted in making a liquid mixed fertilizer. Thus, and again with reference to the drawing, the hot melt from the outlet conduit 23 may be discharged directly (through conduit 25) into a suitable tank or vessel 26 where it is dissolved directly (without being solidified in the granulator) in an aqueous solution. Supplemental materials, such as urea, ammonium nitrate, or potash may be mixed with the liquid. In general, additional ammonia is required to adjust plant food ratio and the pH of the solution.

While as shown, the product melt may be passed directly into the granulator 24. However, this operation has at times proved to be a difficult, costly and time consuming operation, due in part to the high energy output required for granulation, plugging of the screw, and production of high amounts of oversize material (up to 40%) which must be crushed and recycled to the system. Thus, and in accordance with a further embodiment of this invention a preferred mode of operation includes preparing a fluid fertilizer by passing the hot melt directly into the tank 26 (as described above) and thereafter granulating the fluid product, which greatly minimizes the energy input required, plugging, etc. as involved in granulating the hot melt itself. This is true even though the fluid product contains a high percentage of the $P_2O_5$ content in non-ortho form.

In practicing the instant invention, the wet-process phosphoric acid is preferably heated to a temperature in the range of about 200–350° F. Pressure is maintained on the acid solution during the heating and ammoniation phases of the process. The pressure may be in the range of approximately 1–100 p.s.i. with a preferred range of approximately 10–40 p.s.i. Sufficient heat is imparted to the solution during the preheating and ammoniation phases of the process to bring the solution above its normal boiling temperature by the end of the ammoniation phase. In the reaction zone (i.e., the pipe-line reactor 9) the intimately mixed acid and ammonia react generating all the heat necessary for effecting the reaction. Temperature control is critical in this reaction, with the preferred reaction temperature being in the range of 400–500° F. While the temperature necessary to effect the reaction is generated solely by the exothermic heat of reaction (thus obviating the requirement of external sources of heat) the pipe-line reactor may be provided with a heating jacket (not shown) to maintain the reaction temperature within the preferred range.

The following examples serve to illustrate the present invention, but are not intended to limit it thereto.

EXAMPLE 1

In this example, the equipment used was substantially as shown in FIGURE 1. Merchant Grade Wet-Process phosphoric acid at a rate of approximately 35 lbs./min. was pumped from the storage tank into the inlet end or elbow of the tubular pipe-line reactor 9. The wet-acid at ambient temperatures in the storage tank was preheated to a temperature of approximately 275° F. by the acid heater 6 in the inlet conduit leading to the inlet end of the said pipe-line reactor. Anhydrous ammonia from the storage tank 20 preheated to a temperature of about 275° F. was introduced to the ammonia nozzle 11 at a rate of approximately 4 lbs./min. The reaction of the ammonia and acid raised the temperature to approximately 450° F. The pressure in the pipe-line reactor was maintained at approximately 36 p.s.i.g.

The reaction product was forced upwardly through the pipe-line section 9 and passed to a spray nozzle wherein it sprayed through an air gap of the chamber and collected in the lower portion or basin 28. In the chamber the hot ammonium polyphosphate melt was dehydrated and the resulting water vapor and ammonia gas were removed through the upper vapor outlet conduit. The dehydration was accomplished by a temperature drop of approximately 100° F. The hot melt in the melt bowl or basin was agitated at a temperature of about 400° F., with a retention time of approximately 5 minutes. The pressure in the dehydration melt collection chamber was provided by a four-blade agitator, rotating at a speed of approximately 350 r.p.m.

Product fines were delivered to a pug mixer simultaneously with the introduction of the hot viscous melt issuing from the conduit 23. The product fines were fed into the pug mixer by a bucket conveyor at a rate of about 4–5 times the rate at which the melt flowed into the pug mixer on a weight basis. The pug mixer was a standard twin shaft pug mill or blunger The average retention time of the material in the pug mixer was approximately 1–2 minutes. The material flowed from the pug mixer as hard solid granules with a temperature substantially less than 250° F. The material from the pug mixer was transferred onto a series of vibrating screens which sized the materials into fine, oversize and product. Oversize was crushed in a hammer mill. Crushed Oversize material and the fines were recycled into the pug mixer.

The product size granules were passed into a conventional rotary cooler wherein the temperature of the granules was reduced to approximately 140–160° F. A representative sample of the resulting product was analyzed. The analysis showed a nitrogen content of 10.1% and a $P_2O_5$ content of 60.2%. The portion of the $P_2O_5$ present in polyphosphate form was 30.6%.

EXAMPLE 2

In an experiment made in apparatus and in accordance with the general procedure of Example 1, the following results were obtained.

Feed rate, lbs./hr.:
    Wet-process acid _____ 151.6
    Anhydrous ammonia _____ 17.4
Reaction temperature, ° F. _____ 460
Dehydration-collection chamber:
    Agitator speed, r.p.m. _____ 350
    Pressure p.s.i.g. _____ 0
    Retention time/min. _____ 4
    Temperature, ° F. _____ 380
    Product grade _____ 11.58–59.2–0

The product contained about 25.6% of its total $P_2O_5$ in a polyphosphate form. After the melt was granulated and solidified, the product was hard and friable. Liquid fertilizers of 10–34–0 and high analysis liquid fertilizers of 7–21–7 and 9–9–9 were made with this solid product. These liquids did not salt out on storage at 75° F. for 30 days.

EXAMPLE 3

The procedure of Example 1 was generally repeated except that the granulation step was omitted and the hot viscous melt was discharged directly from the dehydration-collection chamber into a vessel wherein a liquid fertilizer of 10–34–0 grade was prepared by addition of $NH_3$ and water. The pH of the liquid was adjusted to 5.8–6.1. Impurities were well sequestered and the liquids did not salt out on storage at 75° F. for 30 days.

EXAMPLE 4

In equipment similar to that of Examples 1–3, wet-process phosphoric acid containing 54% $P_2O_5$ was continuously preheated to about 300° F. and introduced at a rate of 150 lb./hr. into the inlet end of the pipe-line reactor 9. Anhydrous ammonia preheated to a temperature of about 300° F. was introduced into the ammonia nozzle 11 at a rate of about 17.2 lb./hr.

The molten reaction product was collected in the melt bowl or basin 28 and was continuously agitated, with a retention time of about 5 minutes. The hot melt was next continuously discharged to the solution mixing tank 26, maintained at a constant level by continuous overflow.

The gaseous mixture (steam and ammonia gas) from the chamber 20 was collected and passed to the solution mixing tank 26 where additional water (at a rate of about 10 lb./hr.) and anhydrous ammonia (at a rate of about 16.5 lb./hr.) were added to maintain a fluid composition having an analysis of 14% N and 42% $P_2O_5$. Approximately 20 grams of clay (Attagel 150) was added to maintain the fertilizer ingredients in suspension form. The suspension did not salt out on storage at 75° F. for 30 days.

While particularly advantageous embodiments of the invention have been described and illustrated, it will be recognized by those skilled in the art that various changes and modifications can be made therein without departing from the scope of the invention as defined by the appended claims.

What is claimed is:

1. In a continuous process for producing ammonium polyphosphate materials comprising the steps of; continuously passing streams of wet-process phosphoric acid containing from 50–56% $P_2O_5$ by weight and anhydrous ammonia into a tubular reaction zone; contacting said phosphoric acid and said ammonia within said reaction to form a reaction mixture and to effect an exothermic reaction between said phosphoric acid and ammonia; utilizing the said heat of reaction to dehydrate the reaction product and form a melt having at least a portion of its $P_2O_5$ content as non-ortho $P_2O_5$; continuously removing said melt from said reaction zone, separating the thus produced melt from water vapor and unreacted ammonia gas;

the improvement in which after removal from the reaction zone the hot melt is continuously agitated at a temperature in the range of about 375–425° F. thereby to provide an ammonium polyphosphatic material which on being added to water forms a stable solution which may be stored for long periods of time without formation of undesirable sludge.

2. In a continuous process for the manufacture of ammonia polyphosphatic materials from wet-process phosphoric acid and ammonia, said process comprising the step of; continuously introducing wet-process phosphoric acid and ammonia into a tubular reaction zone; mixing said phosphoric acid with said ammonia in said reaction zone thereby forming a reaction mixture and bringing about an exothermic reaction between said wet-process phosphoric acid and said ammonia; continuously contacting said acid and ammonia reaction mixture maintained at a temperature in the range of 400–500° F. and at a pressure of at least 10 p.s.i.g. in said reaction zone in a smooth and uninterrupted fashion whereby to form a gaseous product comprising steam and unreacted amomnia and a hot melt of ammonium polyphosphatic material having at least a portion of its $P_2O_5$ content as non-ortho $P_2O_5$; passing said gaseous product and said hot melt of ammonium polyphosphatic material into a second zone; separating the gases from the hot melt; with withdrawing as product from said second zone a melt of ammonium polyphosphatic material; the improvement in which the hot melt of ammonium polyphosphatic material is continuously agitated in said second zone and the melt is maintained in said second zone under agitation and at a temperature in the range of about 375–425° F.

3. A process according to claim 1 wherein the heat from the exothermic reaction raises the temperature of said reaction mixture in said reaction zone to about 450–500° F. and said reaction zone is maintained at superatmospheric pressure, and the said melt is separated from the water vapor and unreacted ammonia gas by continuously removing the superatmospheric pressure as the hot melt and gaseous materials are removed from said reaction zone.

4. A process according to claim 3 wherein said superatmospheric pressure in said reaction zone is in the range of about 30–60 p.s.i. and said wet-process phosphoric acid and said ammonia are preheated to at least 200° F. prior to being introduced into said reaction zone.

5. The process of claim 2 wherein the heat from the exothermic reaction raises the temperature in said reaction zone to at least 400° F. and said melt of ammonium polyphosphatic material is reduced to a temperature below 350° F. in said second zone.

6. A process according to claim 2 wherein said second zone is maintained at approximately atmospheric pressure; and further comprising continuously collecting said product of ammonium polyphosphatic materials and feeding it into one end of a granulator; continuously feeding fine recycle granulated material into said one end of said granulator simultaneously with the introduction of said product into said granulator; bringing about a substantial equalization of the temperature between said recycle and said melt to thereby solidify and cool the mixture; discharging the resulting granules from the opposite end of said granulator; lowering the temperature of said granules below 350° F., and continuously recovering said product granules.

7. A process according to claim 2 and further comprising continuously collecting said product of ammonium polyphosphatic material and charging said product into a solution mixing tank; collecting said gases separated from said melt in said second zone and passing said gases into said solution mixing tank, continuously charging additional water and anhydrous ammonia to said solution mixing tank to form a stable fluid composition having an analyss of about 12–15% N and 38–45% $P_2O_5$ with about 20–55% of the $P_2O_5$ in non-ortho form.

8. A process according to claim 2 in which the temperature in the second zone is about 400° F. and the agitation time is about five minutes.

References Cited

UNITED STATES PATENTS

| | | | |
|---|---|---|---|
| 1,962,185 | 5/1928 | Fauser | 25—50 |
| 3,171,733 | 2/1965 | Hignett et al. | 71—48 |
| 3,310,371 | 3/1967 | Lutz | 23—107 |
| 3,375,063 | 3/1968 | Bookey et al. | 23—107 |
| 3,382,059 | 5/1968 | Getsinger et al. | 71—34 |

OSCAR R. VERTIZ, Primary Examiner

G. A. HELLER, Assistant Examiner

U.S. Cl. X.R.

71—34, 43